United States Patent [19]
Yarrow et al.

[11] 4,035,712
[45] July 12, 1977

[54] ELECTRICAL GENERATING APPARATUS

[75] Inventors: Christopher John Yarrow, Bradford; Ronald Johnson, Leeds; James Patrick Doyle, Shipley, all of England

[73] Assignee: Lucas Industries Limited, England

[21] Appl. No.: 664,339

[22] Filed: Mar. 5, 1976

[30] Foreign Application Priority Data

Mar. 6, 1975 United Kingdom ............... 9290/75

[51] Int. Cl.² ...................... H02M 5/32; H02P 9/42
[52] U.S. Cl. .................................. 322/24; 310/160; 322/32; 322/59; 363/174
[58] Field of Search ............. 322/7, 32, 37, 59, 72, 322/24; 321/7, 61, 62, 63, 64; 310/160

[56] References Cited

U.S. PATENT DOCUMENTS

| 3,571,693 | 3/1971 | Riaz ................................ 321/64 X |
| 3,858,107 | 12/1974 | Yarrow et al. .................. 321/62 X |

Primary Examiner—Robert J. Hickey

[57] ABSTRACT

A constant frequency a.c. generating system includes an alternator driven at a variable speed. A rectifier provides a d.c. supply for a rotary inverter. To maintain the voltage and frequency of the inverter output constant, the frequency is monitored and used to control the alternator field current and the voltage is monitored and used to control the inverter field current in a regulator circuit.

8 Claims, 6 Drawing Figures

ELECTRICAL GENERATING APPARATUS

This invention relates to an electrical generating apparatus for producing constant frequency a.c. from a variable speed prime mover and is particularly applicable to generating apparatus for aircraft where the prime mover is intended primarily for propulsion purposes.

An electrical generating apparatus in accordance with the invention comprises an alternator having an armature winding and a field winding, a rectifier for producing d.c. from the armature output of the alternator at a voltage determined by the alternator speed and the alternator field current, a rotaty inverter including an armature winding, an independently rotatable field winding and switching means connecting the output of the rectifier to the armature winding in synchronism with the rotation of the inverter field winding, the inverter armature winding providing an a.c. output of amplitude and frequency dependent on the d.c. voltage and the speed of rotation of the inverter field winding, and control means for the field windings of the alternator and the inverter controlling the alternator field current in accordance with the frequency of the a.c. output of the inverter and the inverter field current in accordance with the amplitude of the a.c. output of the inverter.

Figure 1:
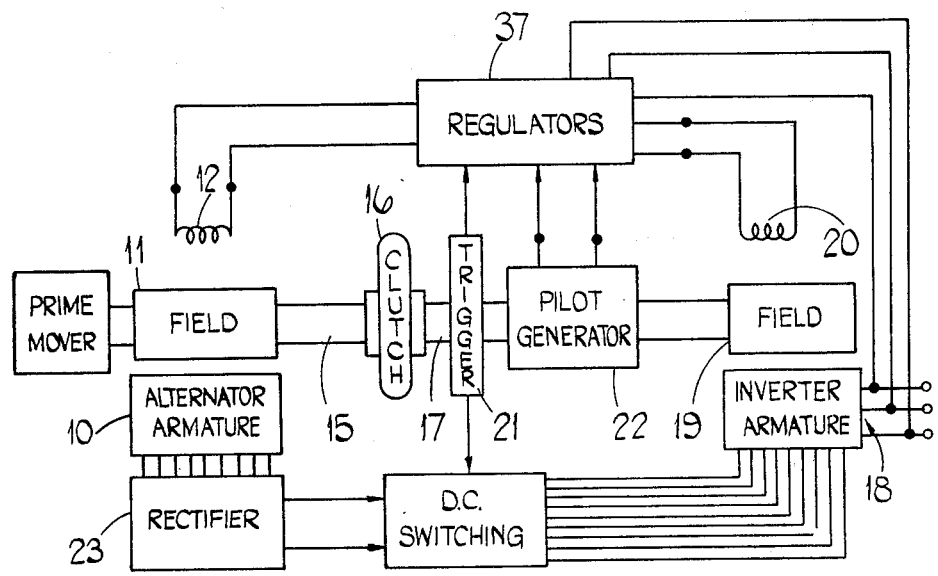
Figure 2:
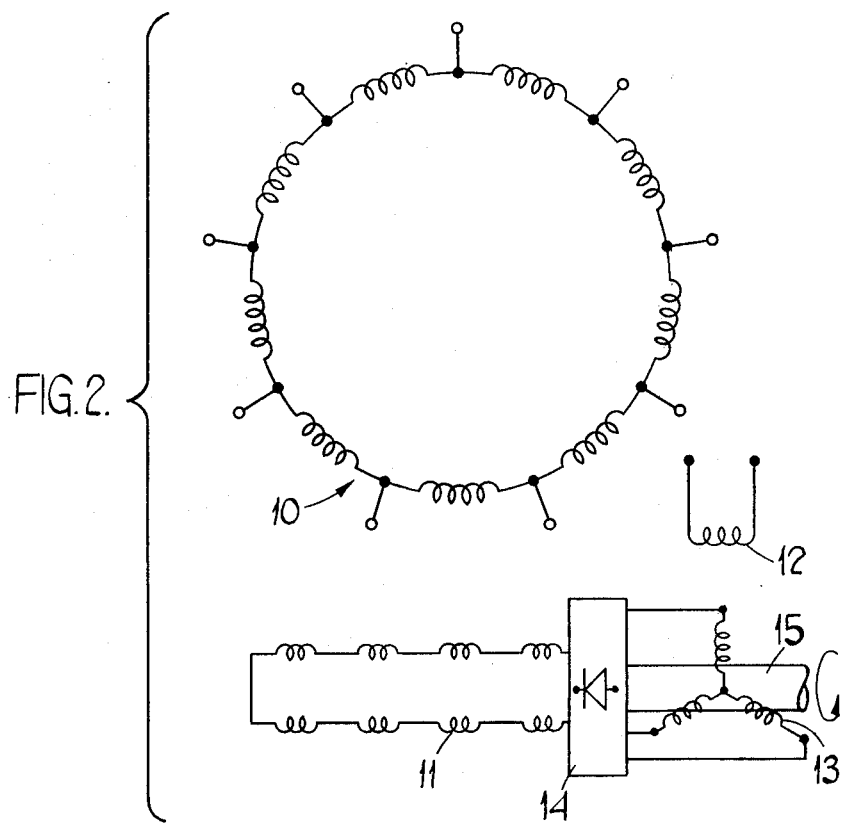
Figure 3:
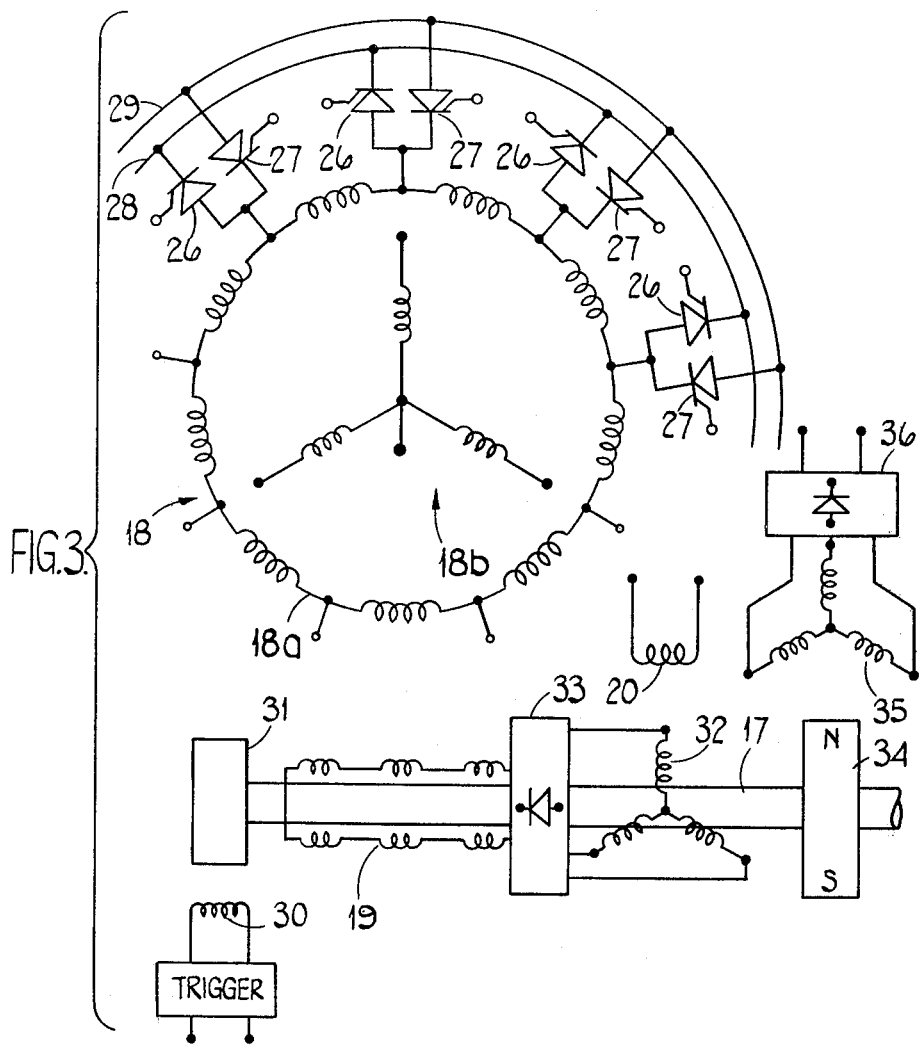
Figure 3A:
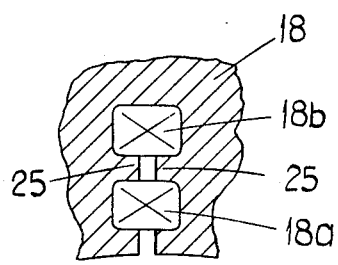
Figure 4:
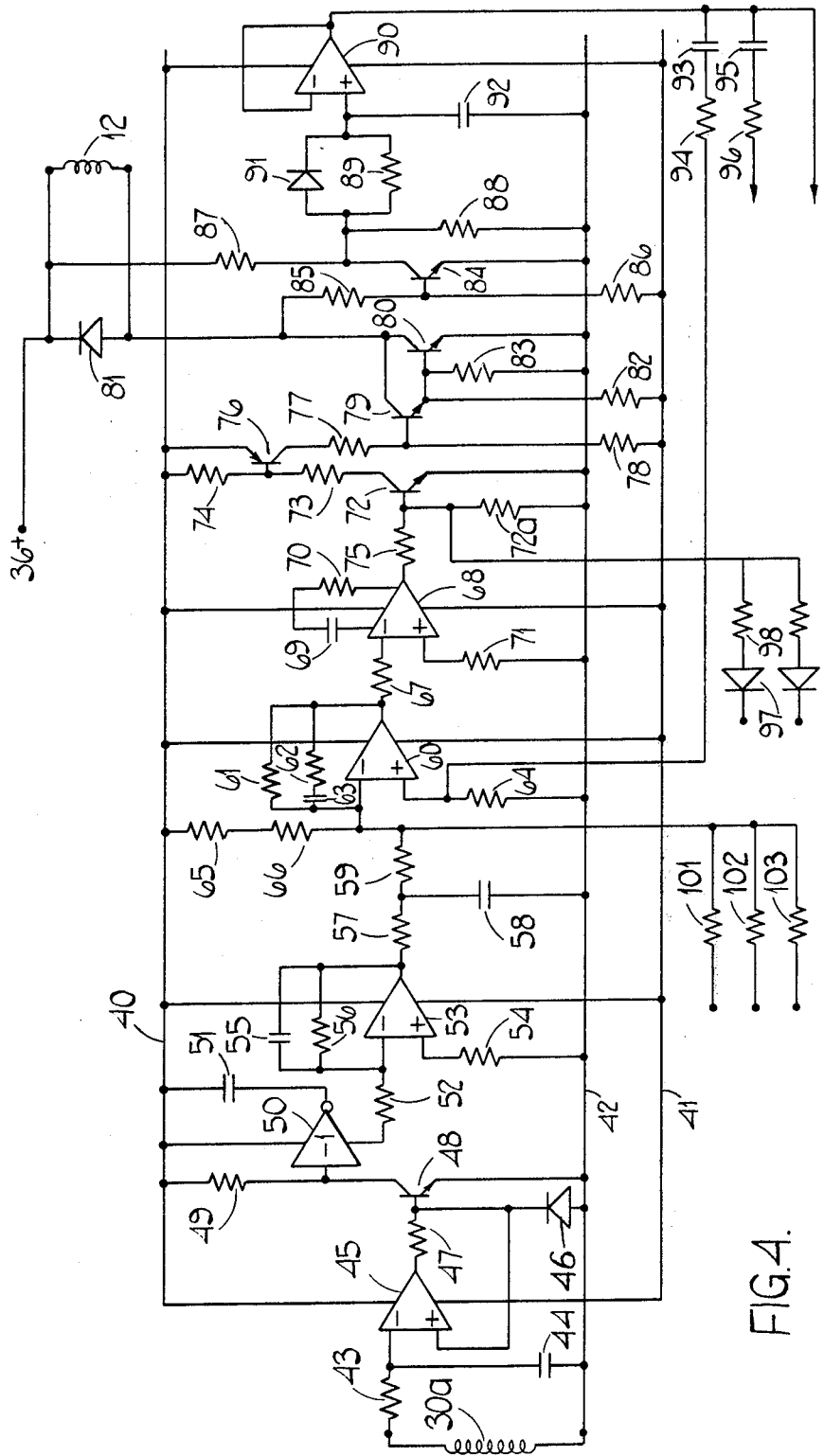
Figure 5:
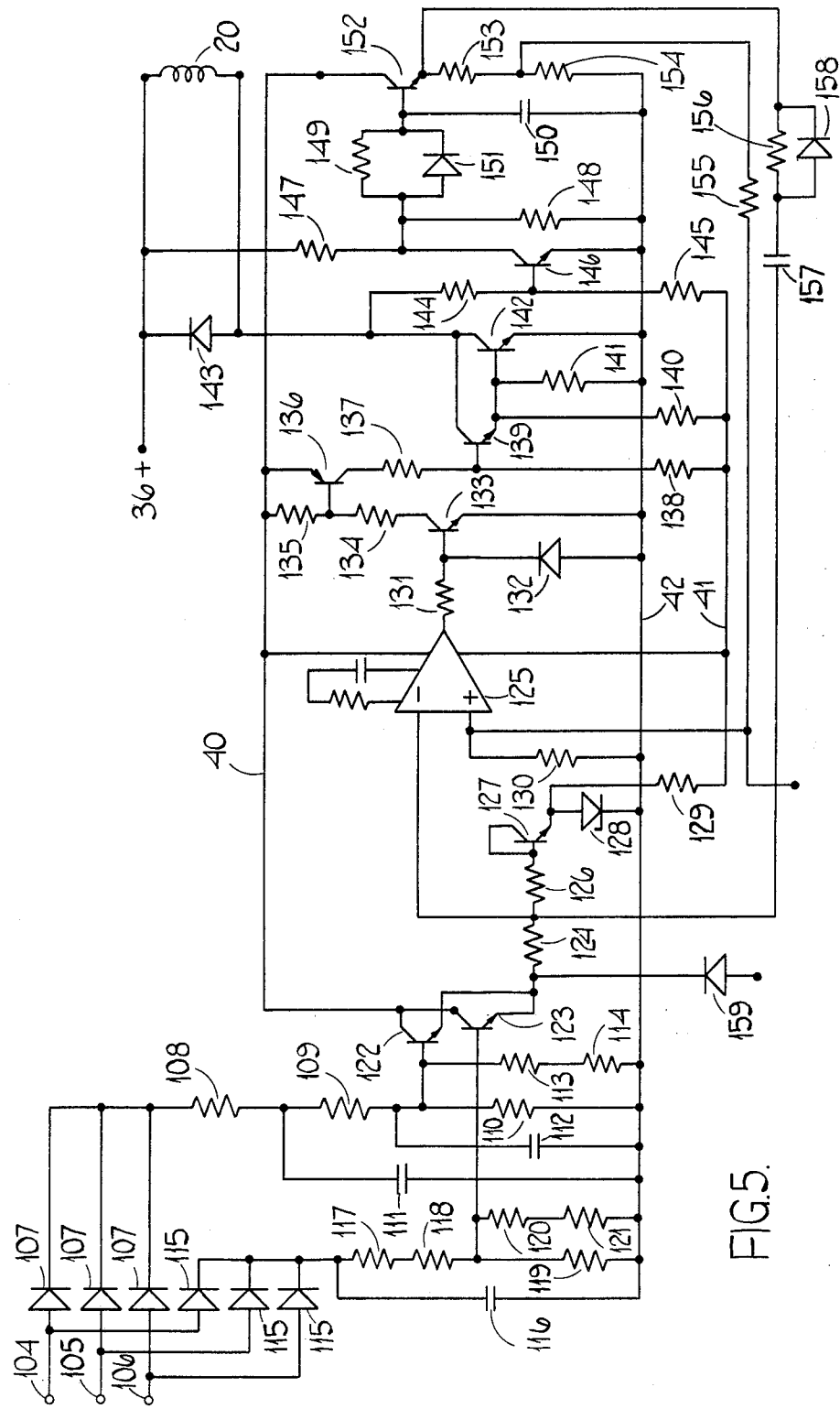

An example of the invention is shown in the accompanying drawings in which:

FIG. 1 is a diagrammatic representation of a generator,

FIG. 2 is a schematic circuit diagram of an alternator forming part of the generator, FIG. 3 is a schematic circuit diagram of an inverter forming part of the generator, FIG. 3a is a diagrammatic fragmentary section of an armature of the inverter, FIG. 4 is a circuit diagram of an electronic control circuit for controlling the generator, and FIG. 5 is a circuit diagram of an electronic control circuit for controlling the inverter.

Referring firstly to FIG. 1 the generator includes a nine-phase alternator having a stationary armature 10 and a two-pole rotating field winding 11 brushlessly coupled to a field drive winding 12. As shown in FIG. 2 such coupling is achieved by a three-phase winding 13 on the rotary shaft of the generator in the field of the field drive coil 12. A rectifier assembly 14 also on the shaft connects the winding 13 to the field winding 11 so that the winding 11 receives d.c. at a level dependent on the d.c. in the coil 12 and the speed of rotation of the shaft. The nine-phase a.c. output voltage of the armature likewise depends on the d.c. applied to the coil 12 and the speed of rotation of the shaft 15. The shaft 15 is driven by a prime mover, the speed of which varies in use.

The shaft 15 is connected via a clutch 16 to a shaft 17 of an inverter having a non-rotatable armature 18, a rotary field winding 19 and a drive coil 20 for the field winding 19. Also on the shaft 17 is a trigger generator 21 and a pilot generator 23.

The nine-phase output of the alternator armature 10 is applied to a rectifier assembly 23, the d.c. output of which is applied to a d.c. switching circuit 24, providing a nine-phase output to the armature 18 of the inverter. As shown in FIG. 3 the armature winding 18 is actually in two portions namely a d.c. portion 18a in the form of a ring of nine coils and an a.c. portion 18b which is a star connected three-phase winding. The winding portions 18a and 18b are contained in the same slots in the armature as shown in FIG. 3a and are therefore magnetically coupled together, but are totally isolated from one another electrically. The slots are preferably specially shaped as shown with ribs 25 on the sides of the slots to separate the windings 18a, 18b.

FIG. 3 also shows part of the d.c. switching circuit associated with the armature windings 18a. This circuit includes nine thyristors 26 and nine thyristors 27. Each thyristor 26 has its anode connected to the cathode of a corresponding one of the thyristors 27 and to the interconnection of two of the coils of armature winding 18a. The cathode of each thyristor 26 is connected to a negative d.c. rail 28 and the anode of each thyristor 27 is connected to a positive d.c. rail 29. The gates of the thyristors 26, 27 are connected to eighteen different coils 30 forming part of the trigger which is described in more detail in our co-pending British patent application No. 9288/75 of even date. Briefly, however, the trigger includes a permanent magnet rotor 31 having three north poles and three south poles with one set of poles each subtending a very substantially larger angle at the axis of the rotor than the other. The separate coils referred to are positioned around the rotor on a stator structure and each produces three short pulses during each revolution of the rotor as the three short poles pass it. Each coil is directly connected between the gate and cathode of the associated thyristor.

The inverter field coil 19 is again a two pole structure coupled to its drive winding 20 by a three-phase rotary winding 32 and a rectifier 33. The current in the field winding 19 again depends on the current in the winding 20 and the speed of the shaft 17.

The pilot generator 22 includes a two pole permanent magnet rotor 34, a three-phase stationary winding 35 and a rectifier 36.

The current in the field drive windings 12 and 20 is supplied by the pilot generator 22 and regulated by a regulator unit 37 to control the frequency and voltage amplitude of the a.c. output of the inverter armature winding 18b. The regulator unit 37 derives its amplitude input signal directly from the inverter output terminals but its frequency input signal is derived from an additional winding in the trigger generator which provides an a.c. output at nine times the frequency of the inverter output. This higher frequency is employed to permit a better accuracy of control to be obtained. The principle of operation is for the regulator for the inverter field winding to be controlled by the amplitude and for the regulator for the alternator field winding to be controlled by the frequency. In steady running conditions switching of the d.c. output of the rectifier 23 by the switching circuit creates a rotating inverter armature magnetic field which interacts with the rotating inverter field winding magnetic field to maintain rotation of the inverter rotor. The required output voltage is obtained from armature winding 18b.

In the circuit shown in FIG. 4 the rails 40, 41 are positive and negative supply rails supplied with d.c. from a voltage regulator (not shown) powered by the pilot generator 35. The rail 42 is at "earth" potential midway between the voltages on rails 40 and 41. The frequency signal from a coil 30a of the trigger generator is applied via an RC low pass network 43, 44 to the invert input terminal of an operational amplifier 45, connected to operate as a wave squarer. The output terminal of amplifier 45 is connected via a resistor 47 to the base of transistor 48 which is an n-p-n transistor operating in grounded emitter configuration. Diode 46 is connected across the emitter-base junction of transistor 48 to prevent reverse breakdown of the junction when the amplifier output is negative. The non-invert input terminal of amplifier 45 is connected directly to the base of transistor 48. This gives positive feedback and ensures that the amplifier output switches rapidly from positive to negative when the input terminal is more positive than the base-emitter voltage of transistor 48. Similarly when the amplifier input goes more negative than the forward voltage drop of diode 46, the amplifier output switches rapidly from negative to positive. The collector of transistor 48 is connected via a resistor 49 to the positive rail 40. The collector of the transistor 48 is also connected to the input terminal of a CMOS inverter 50 which has its drain supply terminal connected to the rail 40 and its output terminal connected by a capacitor 51 to the same rail. The sink supply terminal of the CMOS inverter switch 50 is connected via a resistor 52 to the invert input terminal of an operational amplifier 53 connected as an integrator. The non-invert input terminal of the amplifier 53 is grounded to rail 42 via a resistor 54 and its output terminal is connected back to its invert input terminal via a capacitor 55 and a resistor 56 in parallel. The CMOS inverter switch 50 and the operational amplifier integrator 53 act in combination as a frequency to voltage converter with the output signal consisting of a negative-going d.c. level which increases linearly with input frequency and a superimposed sawtooth wave ripple at the input frequency.

The output terminal of the amplifier 53 is connected via a further RC low pass filter 57, 58, and a resistor 59 to the invert input terminal of an operational amplifier 60. Feedback is provided by a resistor 61 in parallel with a series combination of a resistor 62 and a capacitor 63 between the output terminal and the invert input terminal of the amplifier 60. The non-invert input terminal is connected to the earth rail by a resistor 64 and bias resistors 65, 66 connect the invert input terminal to the positive supply rail 40. These bias resistors are selected during test so that the d.c. output voltage of amplifier 60 is zero when the frequency is exactly correct.

The components associated with amplifiers 53 and 60 are chosen so that the output of amplifier 60 changes ± 40 mV when the input frequency changes ± 0.25%. The ripple voltage is approximately 40 mV peak to peak.

The output terminal of the amplifier 60 is connected via a resistor 67 to the invert terminal of a voltage comparator 68 (shown with an external frequency compensation loop consisting of a capacitor 69 and a resistor 70 in series). The non-invert input terminal of the voltage comparator 68 is connected by a resistor 71 to the earth rail 42. The output of the voltage comparator 68 is a rectangular wavetrain with its mark space ratio varying between 0 and unity over the 0.25% frequency variation represented by the ripple content of the signal from the amplifier 60. When the frequency is outside the 0.25% range the output of the comparator 68 will be continuously positive or negative according to whether the frequency is low or high respectively. Within the 0.25% range the mark space ratio will vary continuously with the frequency.

The output terminal of the voltage comparator 68 drives a power amplifier including an input stage consisting of an n.p.n transistor 72 with its emitter grounded to rail 42, its collector connected to rail 40 by two resistors 73, 74 in series, and its base connected to the output terminal of the voltage comparator 68 by a resistor 75. A bias resistor 72a connects the base of the transistor 72 to the earth rail 42. The interconnection of the resistors 73, 74 is connected to the base of a p-n-p transistor 76 having its emitter connected to the rail 40 and its collector connected via two resistors 77, 78 in series to the rail 41. The interconnection of the resistor 77, 78 is connected to the base of an n-p-n driver transistor 79 the collector of which is connected to the collector of an n-p-n output transistor 80 and through the alternator field drive winding 12 to the positive output terminal of the rectifier 36. A diode 81 is connected across the winding 12 to maintain a path for the field current when the transistors 79, 80 are switched off. The emitter of the transistor 79 is connected to the base of the transistor 80, to the negative rail 41 via a resistor 82 and to the earth rail 42 via a resistor 83. The emitter of the transistor 80 is grounded to the rail 42. The transistor 80 conducts whenever the output of the voltage comparator 68 is positive.

For stabilising control of the current in the field winding 12 there is provided an a.c. feedback path to the amplifier 60. The feedback signal is generated by a circuit including a transistor 84 having its emitter grounded to rail 42 and its base connected to the common point of two resistors 85, 86 connected in series between the collector of the transistor 80 and the rail 41. The collector of the transistor 84 is connected to the positive output terminal of the rectifier 36 via a resistor 87, to the ground rail 42 via a resistor 88 and also, via a resistor 89 to the non-invert terminal of an operational amplifier 90 connected as a voltage follower, having a direct negative feedback connection between its invert input terminal and its output terminal. A diode 91 is connected in parallel with the resistor 89 with its anode connected to the collector of the transistor 84 and a capacitor 92 is connected between the non-invert terminal of the amplifier 90 and the earth rail.

Whenever the transistor 80 is conductive the transistor 84 is non-conductive so that the capacitor 92 charges up to the potential at the junction of resistors 87, 88 through the diode 91. When the transistor 80 stops conducting the transistor 88 conducts and capacitor 92 discharges through the resistor 89. Thus a d.c. signal is generated of amplitude determined by the mean voltage applied to the winding 12. This is fed to the invert input terminal of the amplifier 60 via a capacitor 93 and resistor 94 in series for phase correction.

Various other stabilising loops (not shown in detail) are also employed to obtain stability under all conditions. One such loop includes a further pulse length modulator sensitive to the current drawn from rectifier 23. The output of this modulator is normally positive and is coupled into the control via a diode 97 and a resistor 98 to the base of transistor 72 such that it normally has no effect. In the event of excessive current being drawn, however, negative-going pulses appear at the output of the modulator. These pulses switch off the transistor 72 and the current supplied to the winding 12 is reduced. Capacitor 95 and resistor 96 provide loop stabilisation.

A further loop operates only during running up of the inverter. This loop is a further pulse length modulator sensitive to the output of amplifier 90. The output of this modulator is again introduced into the regulator via a diode 99 and resistor 100. This loop performs the function of limiting the alternator field current during the run-up period thus limiting the acceleration of the inverter, D.c. stabilisation signals related to the current drawn from the rectifier 23, and to the mean resistive load on the a.c. output are applied via resistors 101 and 102 respectively to the non-invert input terminal of the amplifier. A further resistor 103 connected to the same point receives a control signal whenever it is required to run two of the generators in parallel with a resistive load.

Turning now to FIG. 5 the circuit shown shares the rails 40, 41, 42 with the circuit of FIG. 4. The circuit has three input terminals 104, 105, 106, connected to the three output terminals of the inverter armature winding 18b. These are connected to the anodes of three diodes 107 with their cathodes interconnected and connected to the earth rail 42 by a resistor chain 108, 109, 110. The interconnection of the resistors 108, 109 is connected to the rail 42 by a capacitor 111 and the interconnection of the resistors 109, 110 is connected to the rail 42 by a capacitor 112 and also by a pair of resistors 113, 114 in series. The ripple content of the d.c. signal at the interconnection of the resistors 109, 110 is approximately 1% peak to peak.

A second set of three diodes 115, have their anodes connected to the terminals 104, 105 and 106 and their cathodes interconnected and connected by a capacitor 116 to the rail 42. The capacitor 116 bridges a resistance chain 117, 118, 119, the resistor 119 being bridged by two further resistors 120, 121 in series selected to set the d.c. level at the junction of resistors 118, 119 lower than that at the junction of resistors 109, 110 when the amplitudes of the voltages at the three terminals 104, 105 and 106 are identical. It will be appreciated that the d.c. level at the junction of the resistors 109, 110 is related to the average voltage at the three terminals 104, 105 and 106, whilst that at the junction of resistors 118 and 119 is related to the highest voltage at the three terminals, so that when the voltages differ by more than a predetermined amount the d.c. level at the latter junction will become higher than that at the former.

The junction of resistors 109, 110 is connected to the base of an n-p-n transistor 122 and the junction of the resistors 118, 119 is connected to the base of an n-p-n transistor 123. The collectors of these two transistors 122, 123 are connected to the rail 40 and their emitters are connected together and via a resistor 124 to the invert input terminal of a voltage comparator 125. A further resistor 126 connects this terminal via a diode connected n-p-n transistor 127 to the anode of a zener diode 128 which has its cathode connected to the rail 42. A resistor 129 connects the anode of the zener diode 128 to the negative rail 41. The zener diode provides a reference voltage which is of opposite polarity to the d.c. voltage at the junction 109, 110 when the required average voltage is present at terminals 104, 105, 106, but of opposite polarity. The transistor 127 provides a base-emitter voltage drop to compensate for that introduced by the transistor 123. The resistors 113 and 114 are selected on test, so that when the d.c. level at the junction 109, 110 is correct the d.c. level at the invert terminal of the comparator 125 is zero. The ripple signal is superimposed on this d.c. level and is of a modified sinusoidal form having a fast rise time and a comparative slow fall time. The non-invert terminal of the comparator 125 is connected to rail 42 by a resistor 130 so that in the conditions referred to the output of the comparator will be a rectangular wave pulse train having a 50% "on" time. An increase in the d.c. level within the 1% band will shorten the on time and a decrease will lengthen it. An increase in the d.c. level outside the 1% band will result in the comparator output remaining low and a correspondingly large decrease will cause the comparator output to remain high.

The output terminal of the comparator 125 is connected via a resistor 131 to the cathode of a diode 132, which has its anode connected to rail 42, and to the base of an n-p-n transistor 133 which has its emitter connected to the rail 42. The collector of the transistor 133 is connected via two resistors 134 and 135 in series to the rail 40 and the junction of the resistors 134, 135 is connected to the base of a p-n-p transistor 136 which has its emitter connected to the rail 40. The collector of the transistor 136 is connected via two resistors 137, 138 in series to the negative rail 41, the junction of resistors 137, 138 being connected to the base of an n-p-n driver transistor 139. The emitter of the transistor 139 is connected via a resistor 140 to the rail 41, via a resistor 141 to the rail 42, and also to the base of an n-p-n output transistor 142. The emitter of the transistor 142 is connected to the earth rail 42 and the collectors of the two transistors 139, 142 are connected together and to one end of the winding 20 the other end of which is connected to the positive terminal of the generator 36. A freewheel diode 143 bridges the winding 20.

The output amplifier consisting of the transistors 133, 136, 139 and 142 and their associated components draws current through the winding 20 whenever the output of the cmparator 125 is high and the current through the inverter field winding is therefore regulated in accordance with the inverter output voltage, to maintain such voltage constant.

The transistors 122, 123 act as a "high wins" gate which enables the high phase detection circuit 115, 116, 117, 118, 119, 120, 121 to take over control when a predetermined degree of imbalance occurs.

For stabilisation the average voltage across the winding 20 is detected and stabilising signals are fed back to the comparator 125. For this purpose a pair of resistors 144, 145 are connected in series between the collector of the transistor 142 and the negative rail 41. An n-p-n transistor 146 has its base connected to the junction of the resistors 144, 145 and has its collector connected via a resistor 147 to the positive terminal of the pilot generator 36 and via a resistor 148 to the rail 42 to which its emitter is also connected. The collector of the transistor 146 is also connected via a resistor 149 to one side of a capacitor 150, the other side of which is earthed to the rail 42. A diode 151 bridges the resistor 149 with its anode connected to the collector of the transistor 146. This circuit operates in exactly the same way as the corresponding part of the circuit of FIG. 4 with the signal on the capacitor 150 comprising a d.c. level and an a.c. signal both proportional to the average voltage applied to the winding 20. This signal is applied to the base of an n-p-n transistor 152 connected as an emitter follower with resistors 153, 154 in series connecting its emitter to the earth rail 42. The collector of the transistor 152 is connected to the rail 40.

The emitter of the transistor 152 is connected via a resistor 155 to the non-invert input terminal of the comparator 125, thereby providing a small amount of d.c. positive feedback to improve regulation. The junction of the resistors 153, 154 is connected by a resistor 156 and a capacitor 157 in series to the invert terminal of the comparator 125, the resistor 156 being bridged by a diode 158 with its cathode connected to the emitter of the transistor 152. This path provides a phase corrected a.c. feedback signal to the invert terminal.

In addition an external control signal can be applied to the non-invert terminal of the comparator 125 when two of the generators are being used in parallel to drive a reactive load. A diode input 159 is provided for introducing a positive going signal when the a.c. current drawn from the inverter exceeds a predetermined limit. The cathode of this diode 159 is connected to the emitter of the transistor 123 so that a positive going signal applied here will have the effect of reducing the inverter field current.

We claim:

1. An electrical generating apparatus comprising an alternator having an armature winding and a field winding, a rectifier for producing d.c. from the armature output of the alternator at a voltage determined by the alternator speed and the alternator field current, a rotary inverter including an armature winding, an independently rotatable field winding and switching means connecting the output of the rectifier to the armature winding in synchronism with the rotation of the inverter field winding, the inverter armature winding providing an a.c. output of amplitude and frequency dependent on the d.c. voltage and the speed of rotation of the inverter field winding, and control means for the field windings of the alternator and the inverter controlling the alternator field current in accordance with the frequency of the a.c. output of the inverter and the inverter field current in accordance with the amplitude of the a.c. output of the inverter.

2. An apparatus as claimed in claim 1 in which the control means includes an alternator field current control comprising a frequency-to-voltage converter connected to a frequency signal coil providing a d.c. signal of magnitude corresponding to the frequency of the a.c. output of the inverter and comparator means for varying the alternator field current in accordance with the error between the d.c. signal and a reference signal.

3. An apparatus as claimed in claim 2 in which the frequency-to-voltage converter output consists of said d.c. signal with a superimposed ripple signal, said comparator means switching the alternator field current on and off at the frequency of said ripple signal when the error is less than the amplitude of said ripple signal.

4. An apparatus as claimed in claim 2 in which the inverter includes a triggering pulse generator for controlling the switched application of d.c. to the inverter armature in synchronism with the rotation of the inverter field winding, a triggering pulse generator incorporating said frequency signal coil.

5. An apparatus as claimed in claim 4 including a pulse squarer connecting the frequency signal coil to the frequency-to-voltage converter.

6. An apparatus as claimed in claim 1 in which the control means includes an inverter field winding control comprising rectifier means connected to the alternator output for producing a d.c. signal corresponding to the amplitude of the a.c. output of the inverter, and comparator means controlling the inverter field current in accordance with the error between said d.c. signal and a reference signal.

7. Apparatus as claimed in claim 6 in which said rectifier means includes ripple reducing filter means such that a ripple signal is superimposed on said d.c. signal and said comparator acts to switch the inverter field current on and off at the frequency of said ripple signal when the error is less than the amplitude of the ripple signal.

8. An apparatus as claimed in claim 6 in which the inverter is a polyphase inverter and said rectifier means includes a first set of diodes connected by a common resistor to a first capacitor to provide on said capacitor a voltage related to the average amplitude of the a.c. signals on the phase terminals of the inverter, and a second set of diodes connected directly to a second capacitor so as to provide on said second capacitor a voltage related to the highest voltage achieved on any of the phase terminals, and means for automatically selecting which capacitor signal is applied to the comparator means in accordance with the relative magnitudes of said capacitor signals.

* * * * *